US006710297B1

(12) United States Patent
Artelsmair et al.

(10) Patent No.: US 6,710,297 B1
(45) Date of Patent: Mar. 23, 2004

(54) METHOD OF DETECTING A WELDING VOLTAGE

(75) Inventors: Josef Artelsmair, Wartberg/Krems (AT); Michael Brunner, Seiersberg (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 09/980,957

(22) PCT Filed: Jun. 5, 2000

(86) PCT No.: PCT/AT00/00158

§ 371 (c)(1),
(2), (4) Date: Mar. 21, 2002

(87) PCT Pub. No.: WO00/74888

PCT Pub. Date: Dec. 14, 2000

(30) Foreign Application Priority Data

Jun. 4, 1999 (AT) .............................. 996/99

(51) Int. Cl.[7] .............................. B23K 9/095
(52) U.S. Cl. .............................. 219/130.01; 219/130.31; 219/137 PS
(58) Field of Search .............................. 219/130.01, 130.21, 219/130.31, 130.33, 130.51, 137 PS, 130.32

(56) References Cited

U.S. PATENT DOCUMENTS

| 4,734,556 | A | | 3/1988 | Namiki |
| 5,043,557 | A | * | 8/1991 | Tabata et al. .......... 219/130.51 |
| 5,942,139 | A | | 8/1999 | Moriguchi et al. |
| 6,359,258 | B1 | * | 3/2002 | Blankenship et al. .. 219/137 PS |

FOREIGN PATENT DOCUMENTS

| DE | 197 17 462 | 10/1998 |
| EP | 0 868 959 | 10/1998 |
| JP | 11123547 | 5/1999 |
| SU | 1816604 | 5/1993 |

OTHER PUBLICATIONS

Mecke et al, "Schnelle Elektronische Speisequellen Für Schweisslichtbögen", vol. 48, No. 4, 1994 pp. 143–150.

* cited by examiner

Primary Examiner—Clifford C. Shaw
(74) Attorney, Agent, or Firm—Collard & Roe, P.C.

(57) ABSTRACT

The invention describes a method of detecting welding process voltage, whereby the welding process voltage between a welding torch (10) and a workpiece (16) is detected and the welding process voltage is calculated in real time taking account of the interference variables of a welding system, in particular an inductance and a resistance.

9 Claims, 2 Drawing Sheets

METHOD OF DETECTING A WELDING VOLTAGE

CROSS REFERENCE TO RELATED APPLICATIONS

Applicants claim priority under 35 U.S.C. §119 of Austrian Application No. A 996/99, filed on Jun. 4, 1999. Applicants also claim priority under 35 U.S.C. §371 of PCT/AT00/00158, filed on Jun. 5, 2000. The international application under PCT article 21(2) was not published in English.

The invention relates to a method of detecting a welding process voltage, between a welding torch an a workpiece, comprising the step of performing a calculation of the welding process voltage in real time, taking account of the interference variables, in particular an inductance and a resistance of a welding system.

Document DE 197 17 462 A1 discloses a method and a switching system for detecting interference variables and determining arc voltage, in which an actual value for the working voltage is reduced to the sum of the partial voltage releases relevant to the actual welding process needed to control the welding current source via the arc and via the end of the electrode through which the welding current flows, so that only the effective resistance values are used for control purposes, without additionally having to involve in the control system any interference variables which influence the control system and hence the transmissibility, comparability, reproducibility, process stability and finally welding quality. In this method, the detected working voltage is transmitted to a welding current source, the working voltage being detected externally to the output terminals of the current source as a sum of the partial voltage releases relevant to the actual welding process via an arc and via an end of an electrode through which the welding current flows, as well as via a resistance of the workpiece, additional measuring lines being provided for the detection process. These are connected to a controller so that the drop in voltage can be measured or detected via these measuring lines.

The disadvantage of this arrangement is that providing additional lines considerably increases the amount of wiring needed for a welding process and the parallel transmission to the welding lines gives rise to extra interference signals which affect the measuring lines and have to be compensated at great technical expense and which can lead to faulty measurements.

The underlying objective of the invention is to propose a method of detecting the welding process voltage, whereby the calculated or detected interference variables of the welding process voltage can be incorporated in the control process without incurring significant expense.

This objective is achieved by the invention by performing the calculation for determining inductance at a specific time interval during a welding process without the welding process being affected. This makes it possible to adapt to the control speed or to the requisite welding quality so that welding processes can be run at a very high control rate and to a high welding quality. The advantage of this arrangement is also that the interference variables can be detected without the need for additional hardware, thereby avoiding any external influences. Another advantage resides in the fact that the calculation method used to determine the interference variables can be run continuously or periodically, which means that in the case of a pulse welding process, a control can be applied during the entire duration of the pulse, making it possible to use or generate very short pulses without having to extract a corresponding range that is not controllable, as is necessary with the prior art.

It is also of advantage to apply the calculated welding process voltage by a control unit to the welding process. This produces a very high welding quality because the interference variables can be taken into account in the process control.

It is additionally of advantage if the interference variable are detected and/or calculated by the control unit before the start of the actual welding process because this obviates the need for an additional control device for the detection or calculation process and instead this calculation can be operated by the control device used to regulate the process.

A standardised structure can be used for the equipment if a voltage and a current at the outputs of the current source are measured by a measuring device.

The welding process control is optimised and older welding equipment or welding current sources can be simply and inexpensively improved by means of a software update if a welding process control is performed during the entire pulse duration and the interference variables are calculated by the control unit by means of software using the detected values and a predetermined calculation program.

The invention will be described with reference to an example of an embodiment.

Figure 1:
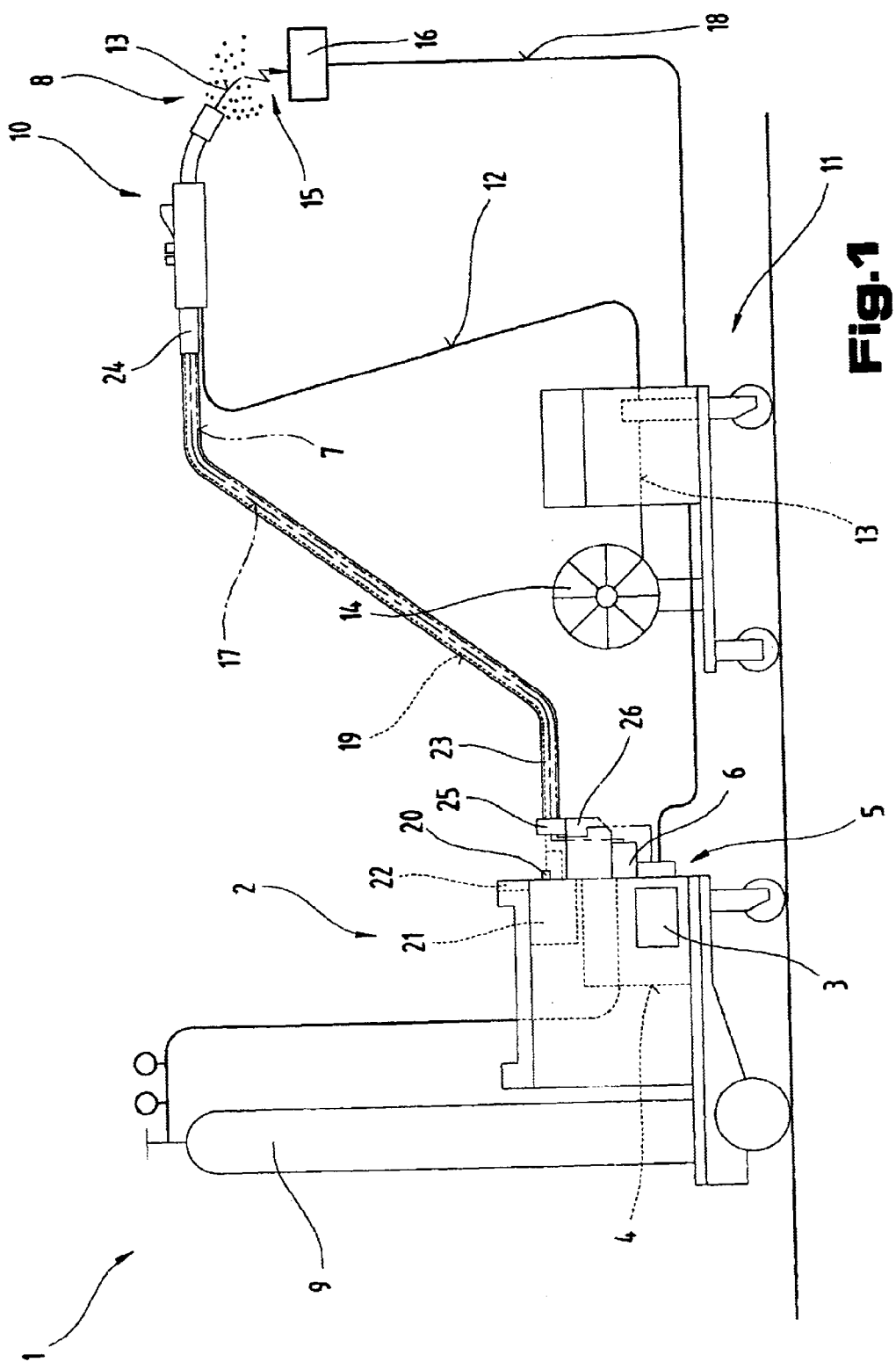
FIG. 1 is a schematic diagram of a welding machine or a welding device.

Firstly, it should be pointed out that the same parts mentioned in the different explanations of the embodiment are denoted by the same reference numbers. The positions chosen for the purposes of the description relate to the drawing specifically being described and can be transposed in terms of meaning to a new position when another position is being described.

Figure 2:
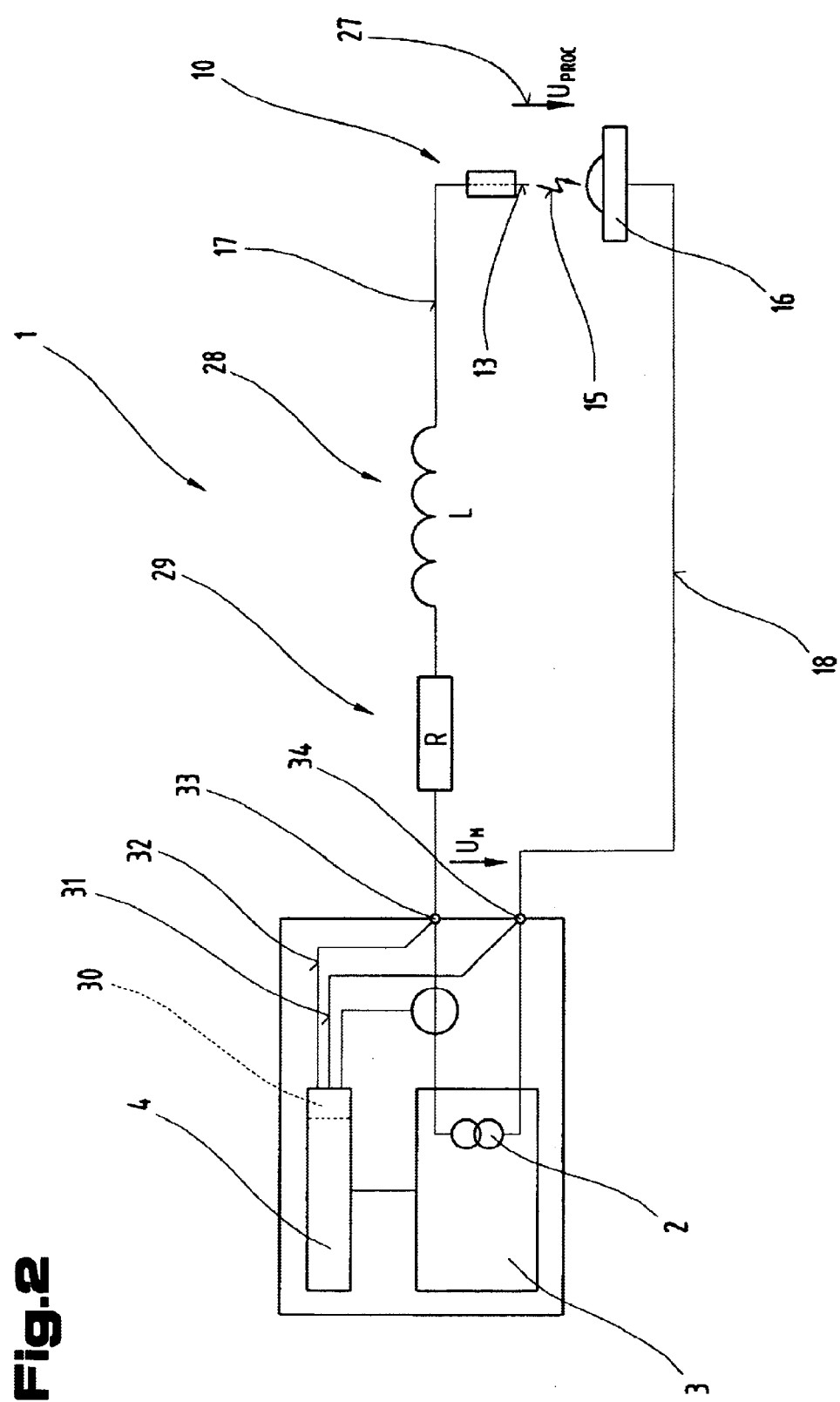
FIG. 2 is simplified, schematic operating diagram of the welding device and welding current circuit.

FIGS. 1 and 2 illustrate a welding system or a welding device 1 for operating a whole variety of welding processes, such as MIG/MAG welding or TIG welding or electrode welding processes. Clearly, the solution proposed by the invention may also be used with a current source or a welding current source.

The welding device 1 comprises a current source 2 with a power component 3, a control unit 4 and a switching element 5 co-operating with the power component 3 and the control unit 4. The switching element 5 or the control unit 4 is connected to a control valve 6, which is arranged in a supply line 7 for a gas 8, in particular an inert gas such as $CO_2$, helium or argon and similar, between a gas storage 9 and a welding torch 10.

In addition, a wire feed device 11, such as commonly used in MIG/MAG welding, may be activated via the control unit 4, as a result of which a welding wire 13 is fed via a wire feed line 12 from a supply drum 14 into the region of the welding torch 10. Clearly, the wire feed device 11 could also be integrated in the welding device 1, in particular the basic housing, as is common practice in the prior art, rather than being provided as an additional device in the manner illustrated in FIG. 1.

The current needed to strike an arc 15 between the welding wire 13 and a workpiece 16 is fed from the power component 3 of the current source 2 to the welding torch 10 and the welding wire 13 via a welding line 17, the workpiece 16 to be welded also being connected to the welding device 1, in particular the current source 2, by another welding line 18, thereby enabling a current circuit to be established across the arc 15.

In order to cool the welding torch 10, the welding torch 10 may be connected to a fluid container, in particular a water container 21, via a coolant circuit 19 with a flow indicator 20 connected in between, so that the coolant circuit 19, in particular a fluid pump provided as a means of conveying the liquid in the water container 21, can be activated when the welding torch 10 is switched on, thereby providing cooling for the welding torch 10 and the welding wire 13.

The welding device 1 also has an input and/or output device 22, by means of which a whole variety of welding parameters and operating modes of the welding device may be set. The welding parameters entered from the input and/or output device 22 are transmitted to the control unit 4, from where the individual components of the welding system or the welding device 1 are activated.

In the example of the welding torch 10 illustrated as an example here, a hose pack 23 is also connected to the welding device 1 or the welding unit. The individual lines from the welding device 1 to the welding torch 10 are disposed in the hose pack 23. The hose pack 23 is connected to the welding torch 10 by means of a connector unit 24 known from the prior art, whilst the individual lines in the hose pack 23 are connected to the individual contacts of the welding device 1 via connector jacks or socket connectors. To ensure that the hose pack 23 is relieved of any tension, the hose pack 23 is connected to a housing 26, in particular the basic housing of the welding device 1, by means of a pull-relief device 25.

In the welding device 1 or welding system illustrated, the process for calculating the interference variables and a welding process voltage 27, schematically illustrated in the region of the arc 15, is integrated in the control unit 4. Since this process is provided in the form of a software programme, no further drawings are provided. However, to enable this process to be run by the control unit 4, the control unit 4 is provided in the form of a microprocessor controller. Clearly, any other type of control unit 4 could be integrated in the welding device 1 as a means of running software programmes, such as a stored-programme controller, a computer or PC, etc.

For the purposes of the method proposed by the invention, used to determine the welding process voltage 27, in which a real time calculation of the welding process voltage 27 is applied to a welding system and allowance is made for interference variables, in particular an inductance 28 and a resistance 29, the actual welding process voltage 27 which is applied to the welding process control is calculated throughout the entire processing duration by means of the formula $$U_{proc}(t)=U_M(t)-(dI(t)*L)-(I(t)*R).$$

The definition of the formula is as follows:

$U_M(t)$ the instantaneous voltage measured at the welding jacks, in particular at the output terminals 33, 34, by a measuring device 30 via measuring lines 31, 32;

$dI(t)$ the instantaneous change in current;

$I(t)$ the current measured instantaneously at the welding jacks;

R the resistance 29 determined by a static measuring process or preset to a known variable;

L the inductance 28 determined by a static measuring process or calculated during the welding process.

Since the welding inductance, in particular the inductance 28, is susceptible to constant change, particularly in robot systems, it is re-calculated continuously or at specific time intervals during the welding process. To this end, the known resistance behaviour of the arc 15, in other words the electrical behaviour of the arc 15, or the constant resistance is applied during a short-circuit and the current inductance 28 determined by analysing changes in the current and voltage. If a welding process does not involve any process-related changes in current such as would be needed to calculate the inductance 28, a current pulse, which does not affect the welding process, can be modulated on top as a means of calculating inductance in the welding circuit, i.e. in order to calculate the interference variables during a welding process for a stable state of the welding process, a balancing pulse is modulated upon or imposed on the welding current and the detected values are then applied for calculation purposes at fixed points in time.

The static detection of interference variables, which can be initiated before the actual welding process, is triggered by the user or alternatively by a robot or automation. To this end, the ends of the positively polarised and the negatively polarised welding line 17, 18, e.g. the contact pipe of the welding torch 10 in MIG or MAG welding and in WIG or electrode welding the electrode holder with the workpiece 16, are short-circuited and the detection of interference variables initiated. The resistance calculation is performed at a constant current at a predetermined point in time, i.e. dI=0, for which purpose a measurement or the detected values of the voltage and current at the output terminals 33, 34 of the current source 2 are used by the control unit 4 as a means of calculating the resistance 29. During this process, a current pulse may be imposed after the resistance calculation, thereby making it very easy to calculate the inductance 28. Since the welding circuit resistance, in particular the ohmic resistance 29, barely changes for a constant system structure, it is only necessary to determine the resistance when the system or the welding unit is switched on or has been fitted with different equipment.

In order to be able to calculate the individual interference variables, the measuring device 30 is disposed in the welding device 1 and is connected to the output terminals 33, 34 of the current source 2 by means of measuring tines 31, 32. The welding lines 17, 18 for the welding torch 10 and the workpiece 16 are connected to the output terminals 33, 34. Consequently, the voltage and the current at the outputs of the current source 2, in particular the output terminals 33, 34, can be detected or measured by the measuring device 30. As schematically illustrated, the current may be measured in particular by a separate current measuring device which picks up the magnetic field built up by the lines through which current is flowing and shapes it into an appropriate voltage signal which is evaluated by the measuring device 30 or the control unit 4 and correlated back to the actual current.

This calculation process has a significant advantage in that no external influences affect the measurement results of the measuring device 30 because very short measuring lines 31, 32 can be used. The user of a welding device 1 of this type does not have to set up any additional wiring for the welding process, ruling out faulty connections or poor contacts.

The various calculation processes stored in the control unit 4 are adapted to the differing process states. The voltage and the current at the output terminals 33, 34 are measured continuously by means of the measuring device 30 and the welding process voltage 27 calculated on a continuous basis, which means that the actual value of the welding process voltage 27 is available at all times.

By running the calculation process, the welding process voltage 27 calculated by the control unit 4 can now be used for the welding process control, thereby producing optimum welding quality. This being the case, formulas needed for the calculation process may be stored in the control unit 4, which is preferably provided in the form of a microprocessor controller.

Because these formulas are stored, the control unit 4 is in a position to compute the individual voltages, in particular the individual partial voltages for the inductance 28 and the resistance 29. By means of the detected or calculated interference variables, compensation for the interference variables can now be incorporated in the control process or in the welding process, i.e. these interference variables are taken into account when regulating the welding process so that a more accurate regulation can be applied. At the same time, because the welding process voltage 27 has been calculated, the actual status at the welding torch 10 and the end of the welding wire with regard to the arc 15 is known and a short-circuit between the welding wire 13 and the workpiece 16 can be picked up more quickly, for example, so that the control unit 4 can resolve the short-circuit rapidly by activating the current source 2 accordingly, simultaneously avoiding weld spatter.

Because the welding process voltage 27 is calculated on a constant basis, any changes in the process sequence can be detected in good time, irrespective of how great the speed of the change in current and the welding circuit inductance are. If, on the other hand, the voltages measured at the output terminals 33, 34 are used as a means of regulating the welding process, the voltage is adjusted to a lower range than is available in the welding process whenever the current drops, i.e. a negative dI. As a result, the control unit 4 is able to detect a short-circuit whenever there is a downward slope, whereupon the process control increases the current even though there is no actual short-circuit in the welding process. In order to avoid this in welding processes known from the prior art, short-circuit detection is not operated in this process phase or this process phase is eliminated, which means that if any short-circuits do in fact occur in this phase, they are not detected.

By using the method proposed by the invention, it is possible to operate a process control for the entire duration of the pulse without having to eliminate specific process phases.

Essentially, it should be pointed out that this method is operated by means of software and that software-based control functions can be performed by the control unit 4 in addition, in order to compensate for interference variables or to control the welding process, i.e. the interference variables are calculated by the control unit 4 using software, on the basis of the values detected by the measuring device 30, and a predetermined calculation programme and the accuracy of the result is simultaneously checked by control functions in the software.

It should finally be pointed out that in order to provide a clearer understanding of the solution proposed by the invention, individual parts of the embodiment are illustrated on a disproportionately large scale. Also to provide a clearer understanding of the invention, the interference variables, in particular the inductance 28 and the resistance 29, are schematically indicated in the welding line 17. Individual parts of the combinations of features described above in the individual embodiments may be used in conjunction with other individual features from other examples of embodiments and construed as independent solutions proposed by the invention in their own right.

| List of reference numbers | | | |
|---|---|---|---|
| 1 | Welding device | 18 | Welding line |
| 2 | Current source | 19 | Coolant circuit |
| 3 | Power component | 20 | Flow indicator |
| 4 | Control unit | 21 | Water container |
| 5 | Switching element | 22 | Input and/or output device |
| 6 | Control valve | 23 | Hose pack |
| 7 | Supply line | 24 | Connector unit |
| 8 | Gas | 25 | Pull-relief device |
| 9 | Gas storage | 26 | Housing |
| 10 | Welding torch | 27 | Welding process voltage |
| 11 | Wire feed device | 28 | Inductance |
| 12 | Wire feed line | 29 | Resistance |
| 13 | Welding wire | 30 | Measuring device |
| 14 | Supply drum | 31 | Measuring line |
| 15 | Arc | 32 | Measuring line |
| 16 | Workpiece | 33 | Output terminal |
| 17 | Welding line | 34 | Output terminal |

What is claimed is:

1. Method of detecting a welding process voltage detected between a welding torch and a workpiece, comprising the step of performing a calculation of the welding process voltage in real time, taking account of the interference variables including a calculated inductance and a resistance of a welding system, the calculation for determining inductance being performed at specific time intervals during a welding process without the welding process being affected.

2. Method as claimed in claim 1, wherein the calculated welding process voltage is applied by a control unit to the welding process.

3. Method as claimed in claim 2, wherein the interference variables are detected and/or calculated by the control unit before the start of the actual welding process.

4. Method as claimed in claim, 2, wherein, at a predetermined point in time of the current curve, a measurement is taken or the values of the voltage and current detected at the output terminals of the current source by the control unit are used to calculate the resistance.

5. Method as claimed in claim 2, wherein the interference variables are calculated by the control unit by means of software using the detected values and a predetermined calculation program.

6. Method as claimed in claim 1, wherein a voltage and a current at the outputs of the current source are measured by a measuring device.

7. Method as claimed in claim 1, wherein, in order to provide a static calculation of the interference variable of the resistance and the inductance of the hose pack and optionally other ohmic interference variables during a secondary short-circuit prior to the start of the welding process, a current change is imposed on a current curve and the measured voltage is evaluated.

8. Method as claimed in claim 7, wherein the lines of the hose pack are short-circuited or a short-circuit is produced between the electrode of the welding torch and the workpiece with the supply lines of the hose pack connected thereto, taking account of other interference variables, in particular of the welding torch.

9. Method as claimed in claim 1, wherein a process control or a welding process control is performed during the entire pulse duration.

* * * * *